US012673543B2

(12) United States Patent　　　　(10) Patent No.:　　US 12,673,543 B2
Jung　　　　　　　　　　　　　　　　(45) Date of Patent:　　　Jul. 7, 2026

(54) HYBRID VEHICLE

(71) Applicant: Hyundai Transys Inc., Seosan-si (KR)

(72) Inventor: Chang Kyo Jung, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 209 days.

(21) Appl. No.: 18/259,548

(22) PCT Filed: Oct. 22, 2021

(86) PCT No.: PCT/KR2021/014908

§ 371 (c)(1),
(2) Date: Jun. 27, 2023

(87) PCT Pub. No.: WO2022/181921

PCT Pub. Date: Sep. 1, 2022

(65) Prior Publication Data

US 2024/0317039 A1　　Sep. 26, 2024

(30) Foreign Application Priority Data

Feb. 24, 2021　(KR) ......................... 10-2021-0025159

(51) Int. Cl.
B60K 6/26　　　　　(2007.10)
(52) U.S. Cl.
CPC .......... B60K 6/26 (2013.01); *B60K 2006/266* (2013.01); *B60K 2006/268* (2013.01)
(58) Field of Classification Search
CPC ................ B60K 6/26; B60K 2006/266; B60K 2006/268
See application file for complete search history.

(56) References Cited

U.S. PATENT DOCUMENTS

| | | | |
|---|---|---|---|
| 6,476,571 B1 | 11/2002 | Sasaki | |
| 6,862,887 B2 * | 3/2005 | Noreikat | B60K 6/405 903/952 |
| 6,886,648 B1 * | 5/2005 | Hata | B60K 6/387 903/910 |
| 7,992,661 B2 * | 8/2011 | Nomura | B60K 6/405 180/65.245 |

(Continued)

FOREIGN PATENT DOCUMENTS

| | | |
|---|---|---|
| DE | 102012218909 A1 | 5/2013 |
| DE | 112011105893 T5 | 9/2014 |

(Continued)

OTHER PUBLICATIONS

International Search Report dated Feb. 4, 2022 in International Application No. PCT/KR2021/014908.

(Continued)

*Primary Examiner* — James A Shriver, II
(74) *Attorney, Agent, or Firm* — SALIWANCHIK, LLOYD & EISENSCHENK

(57) ABSTRACT

The present invention relates to a hybrid vehicle including an engine part, a power shaft part connected to the engine part and configured to transmit power, a shift part connected to the power shaft part and configured to shift power, a motor part disposed between the engine part and the shift part and configured to rotate the power shaft part, and a power supply part configured to supply electric power to the motor part.

8 Claims, 2 Drawing Sheets

(56) References Cited

U.S. PATENT DOCUMENTS

| | | | | |
|---|---|---|---|---|
| 8,465,387 B2 * | 6/2013 | Conlon | .................. | B60K 6/445 |
| | | | | 180/65.23 |
| 9,873,336 B2 * | 1/2018 | Hokoi | .................... | B60L 58/12 |
| 10,384,527 B2 | 8/2019 | Frank et al. | | |
| 11,524,676 B2 * | 12/2022 | Taitz | .................... | B60W 20/15 |
| 2006/0102409 A1 * | 5/2006 | Kamada | .................. | B60L 50/61 |
| | | | | 180/249 |
| 2007/0007059 A1 | 1/2007 | Nomura et al. | | |
| 2015/0352962 A1 | 12/2015 | Hokoi | | |

FOREIGN PATENT DOCUMENTS

| | | | |
|---|---|---|---|
| JP | 2003146095 A | 5/2003 | |
| JP | 2004129354 A | 4/2004 | |
| KR | 10-20130058993 A | 6/2013 | |

OTHER PUBLICATIONS

Office Action dated Sep. 5, 2025 in German Application No. 112021007164.5.
Office Action dated Apr. 1, 2026 in Chinese Application No. 202180092113.7.

* cited by examiner

HYBRID VEHICLE

CROSS-REFERENCE TO RELATED APPLICATIONS

This application is the U.S. national stage application of International Patent Application No. PCT/KR2021/014908, filed on Oct. 22, 2021, which claims the benefit under 35 U.S.C. § 119 of Korean Application No. 10-2021-0025159, filed Feb. 24, 2021, the disclosures of each of which are incorporated herein by reference in their entirety.

TECHNICAL FIELD

The present invention relates to a hybrid vehicle, and more particularly, to a hybrid vehicle in which an integrated inverter is connected directly to a motor, thereby reducing the number of components and a weight.

BACKGROUND ART

In general, a hybrid vehicle equipped with an engine and a motor/electric generator includes an inverter configured to supply power for driving the motor from a battery, and the battery configured to store electric power generated by the electric generator operated by the motor.

The hybrid vehicle operates the motor by receiving electric power of the battery. Alternatively, the hybrid vehicle operates the engine by the operation of the motor and allows the electric generator to generate electric power by the operation of the engine. The electric power generated by the electric generator is supplied to the battery to charge the battery.

Meanwhile, in the related art, a starter motor is mounted on the engine, and a traveling motor is mounted between the engine and a transmission. For this reason, the starter motor operates during a process of initially starting the engine. The traveling motor operates while the vehicle travels.

However, in the related art, because the engine is disposed between the starter motor and the traveling motor, an inverter is provided to connect the starter motor and the traveling motor and supplies electric power. For this reason, two inverter installation spaces are required, which causes a problem of an increase in inverter manufacturing costs and an increase in number of components. Accordingly, there is a need to solve the problem.

The background technology of the present disclosure is disclosed in Korean Patent No. 10-1198443 (registered on Oct. 31, 2012, and entitled 'Power Transmission Device for Hybrid Vehicle').

DISCLOSURE

Technical Problem

The present invention has been made in an effort to solve the above-mentioned problems, and an object of the present invention is to provide a hybrid vehicle in which an integrated inverter is connected directly to a motor, thereby reducing the number of components and a weight.

Technical Solution

A hybrid vehicle according to the present invention includes: an engine part; a power shaft part connected to the engine part and configured to transmit power; a shift part connected to the power shaft part and configured to shift power; a motor part disposed between the engine part and the shift part and configured to rotate the power shaft part; and a power supply part configured to supply electric power to the motor part.

The motor part may include: a first motor part disposed between the engine part and the shift part and configured to rotate the power shaft part; and a second motor part disposed between the first motor part and the shift part and configured to rotate the power shaft part.

The first motor part may assist an operation of starting the engine part, and the second motor part may output a vehicle driving force.

The power supply part may include: a battery part configured to apply electric power; an inverter part connected to the battery part and configured to convert direct current power into alternating current power; a first connection part configured to connect the inverter part and the first motor part; and a second connection part configured to connect the inverter part and the second motor part.

The first connection part may be connected directly to the first motor part, and the second connection part may be connected directly to the second motor part.

Advantageous Effects

In the hybrid vehicle according to the embodiment of the present invention, the first motor part and the second motor part may be disposed between the engine part and the shift part and provide power to the power shaft part, and the integrated inverter part is used to apply electric power to the first motor part and the second motor part, thereby reducing the number of components and the weight.

EXPLANATION OF REFERENCE NUMERALS AND SYMBOLS

Figure 1:
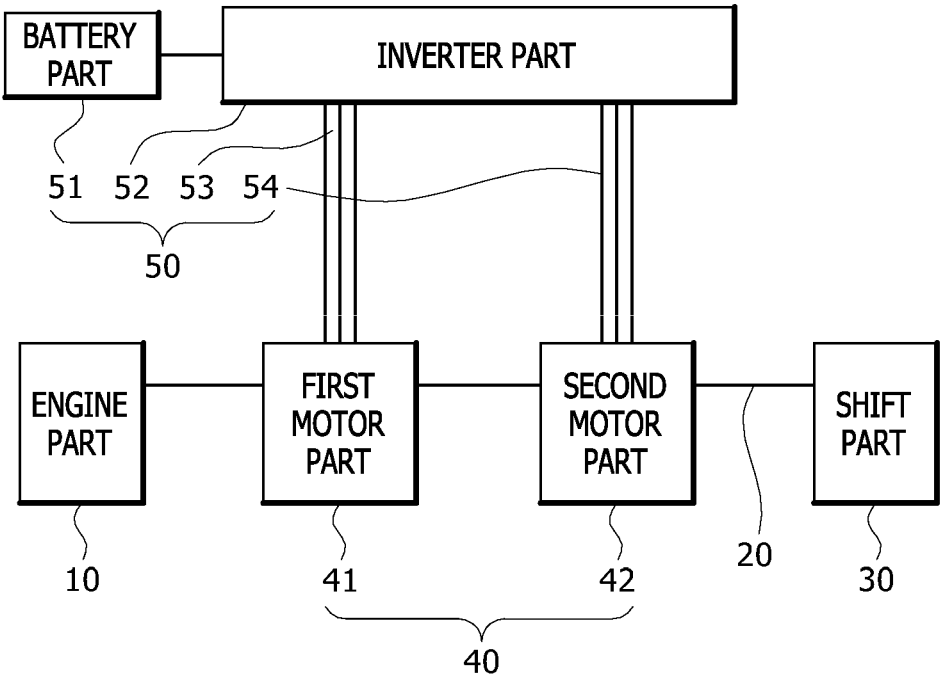
FIG. 1 is a block diagram schematically illustrating a hybrid vehicle according to an embodiment of the present invention.

10: Engine part
20: Power shaft part
30: Shift part
40: Motor part
41: First motor part
42: Second motor part
50: Power supply part
51: Battery part
52: Inverter part
53: First connection part
54: Second connection part

BEST MODE

Hereinafter, an embodiment of a hybrid vehicle according to the present invention will be described with reference to the accompanying drawings. Here, thicknesses of lines illustrated in the drawings, sizes of constituent elements, or the like may be exaggerated for clarity and convenience of description. In addition, the terms used below are defined in consideration of the functions thereof in the present invention and may vary depending on the intention of a user or an operator or a usual practice. Therefore, the definition of the terms should be made based on the entire contents of the present specification.

Figure 2:
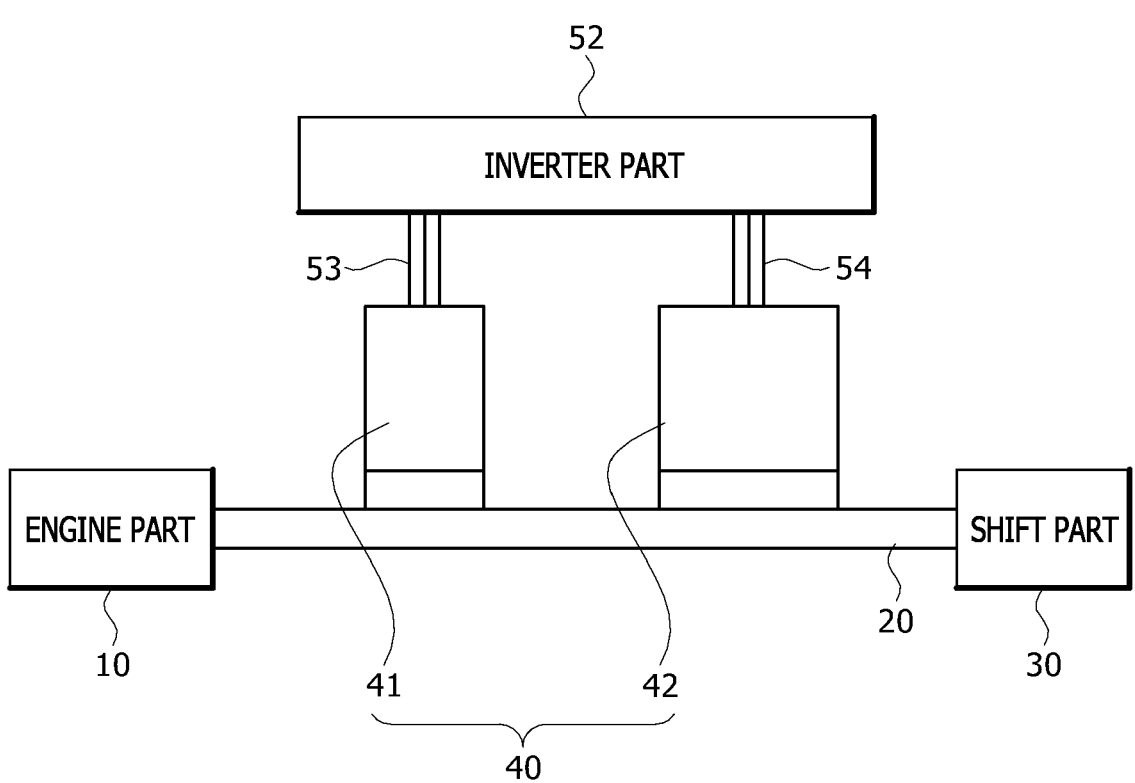
FIG. 2 is a view schematically illustrating the hybrid vehicle according to the embodiment of the present invention.

FIG. 1 is a block diagram schematically illustrating a hybrid vehicle according to an embodiment of the present invention, and FIG. 2 is a view schematically illustrating the hybrid vehicle according to the embodiment of the present invention. With reference to FIGS. 1 and 2, a hybrid vehicle 1 according to an embodiment of the present invention includes an engine part 10, a power shaft part 20, a shift part 30, a motor part 40, and a power supply part 50.

The engine part 10 provides power, and the power shaft part 20 is connected to the engine part 10 and transmits the power. For example, the engine part 10 may provide power, which is generated by an internal combustion engine, to the power shaft part 20. Further, the power shaft part 20 may be rotated by power provided from the engine part 10.

The shift part 30 is connected to the power shaft part 20 and shifts power. For example, the shift part 30 may have various types of planetary gears provided in a housing and shift the power provided from the power shaft part 20.

The motor part 40 is disposed between the engine part 10 and the shift part 30 and rotates the power shaft part 20. For example, the motor part 40 may be kept engaging with the power shaft part 20 and provide the power for driving the vehicle by singly rotating the power shaft part 20 or assisting the engine part 10.

The power supply part 50 supplies electric power to the motor part 40. For example, the power supply part 50 may be disposed adjacent to the motor part 40 and connected directly to the motor part 40 without a connector.

The motor part 40 according to the embodiment of the present invention includes a first motor part 41 and a second motor part 42.

The first motor part 41 is disposed between the engine part 10 and the shift part 30 and rotates the power shaft part 20. For example, the first motor part 41 may operate to start the engine part 10 or operate in a vehicle low-speed section or a regenerative section. More specifically, the first motor part 41 may be used to assist the operation of starting the engine part 10.

The second motor part 42 may be disposed between the first motor part 41 and the shift part 30 and rotate the power shaft part 20. For example, the second motor part 42 may be designed to have a larger capacity than the first motor part 41 and operate in a vehicle high-speed section, a traveling section, and a regenerative section. More specifically, the second motor part 42 may operate to output a vehicle driving force.

The power supply part 50 according to the embodiment of the present invention includes a battery part 51, an inverter part 52, a first connection part 53, and a second connection part 54.

The battery part 51 applies electric power. For example, the battery part 51 is mounted on a vehicle body and kept in a charged state. As necessary, the battery part 51 may apply electric power.

The inverter part 52 is connected to the battery part 51 and converts direct current power into alternating current power. For example, an integrated inverter may be used as the inverter part 52 to supply electric power to the first motor part 41 and the second motor part 42. The inverter part 52 may be disposed outside the first motor part 41 and the second motor part 42 and fixedly installed on the housing for power transmission.

The first connection part 53 connects the inverter part 52 and the first motor part 41. The first connection part 53 is connected directly to the first motor part 41. For example, the first connection part 53 may be a U-phase, V-phase, or W-phase busbar and connected to the first motor part 41 disposed adjacent to the first connection part 53 without a separate connector.

The second connection part 54 connects the inverter part 52 and the second motor part 42. The second connection part 54 is connected directly to the second motor part 42. For example, the second connection part 54 may be a U-phase, V-phase, or W-phase busbar and connected to the second motor part 42 disposed adjacent to the second connection part 54 without a separate connector.

The hybrid vehicle 1 according to the embodiment of the present invention, which is configured as described above, will be described below.

The engine part 10 and the shift part 30 are connected by the power shaft part 20 so as to transmit power, and the first motor part 41 and the second motor part 42 are sequentially disposed between the engine part 10 and the shift part 30. In this case, the first motor part 41 and the second motor part 42 is spline-coupled to the power shaft part 20.

Meanwhile, the integrated electric power supply inverter part 52 is disposed outside the first motor part 41 and the second motor part 42. A third connection part 53 and a fourth connection part 54, which are provided in inverter part 52, are respectively connected to the first motor part 41 and the second motor part 42.

In this state, the single inverter part 52 supplies electric power to the first motor part 41 and the second motor part 42, which may reduce the number of components and the weight in comparison with the case in which separate inverters are used.

In the hybrid vehicle 1 according to the embodiment of the present invention, the first motor part 41 and the second motor part 42 may be disposed between the engine part 10 and the shift part 30 and provide power to the power shaft part 20, and the integrated inverter part 52 is used to apply electric power to the first motor part 41 and the second motor part 42, thereby reducing the number of components and the weight.

While the present invention has been described with reference to the embodiments depicted in the drawings, the embodiments are for illustrative purposes only, and those skilled in the art to which the present technology pertains will understand that various modifications of the embodiments and any other embodiments equivalent thereto are available. Accordingly, the true technical protection scope of the present invention should be determined by the appended claims.

The invention claimed is:

1. A hybrid vehicle comprising:
an engine part;
a power shaft part connected to the engine part and configured to transmit power;
a shift part connected to the power shaft part and configured to shift power;
a motor part disposed between the engine part and the shift part and configured to rotate the power shaft part; and
a power supply part configured to supply electric power to the motor part,
wherein the motor part comprises:
a first motor part disposed between the engine part and the shift part and configured to rotate the power shaft part; and a second motor part disposed between the first motor part and the shift part and configured to rotate the power shaft part, wherein the power supply part comprises:

a battery part configured to apply electric power;

a single inverter part connected to the battery part and configured to convert direct current power into alternating current power;

a first connection part configured to connect the single inverter part and the first motor part; and a second connection part configured to connect the single inverter part and the second motor part, and wherein the power shaft part is directly connected to both the engine part and the shift part.

2. The hybrid vehicle of claim 1, wherein the first motor part is configured to assist an operation of starting the engine part.

3. The hybrid vehicle of claim 1, wherein the second motor part outputs a vehicle driving force.

4. The hybrid vehicle of claim 1, wherein in operation the first motor part and the second motor part are kept engaging with the power shaft part and assist the engine part or singly rotate the power shaft part.

5. The hybrid vehicle of claim 4, wherein the first motor part and the second motor part are spline-coupled to the power shaft part.

6. The hybrid vehicle of claim 1, wherein in operation the single inverter part supplies electric power to the first motor part and the second motor part.

7. The hybrid vehicle of claim 1, wherein the single inverter part is disposed outside the first motor part and the second motor part.

8. The hybrid vehicle of claim 1, wherein the first connection part is connected directly to the first motor part, and the second connection part is connected directly to the second motor part.

\* \* \* \* \*